(12) United States Patent
Dis

(10) Patent No.: US 9,174,743 B2
(45) Date of Patent: Nov. 3, 2015

(54) PROTECTIVE COVER FOR AIRCRAFT PITOT PROBES

(71) Applicant: James Van Dis, Washington, NC (US)

(72) Inventor: James Van Dis, Washington, NC (US)

(73) Assignee: SERIAS DESIGN LLC, The Villages, FL (US)

( * ) Notice: Subject to any disclaimer, the term of this patent is extended or adjusted under 35 U.S.C. 154(b) by 405 days.

(21) Appl. No.: 13/891,762

(22) Filed: May 10, 2013

(65) Prior Publication Data

US 2014/0331767 A1 Nov. 13, 2014

(51) Int. Cl.
*G01D 11/24* (2006.01)
*B64D 45/00* (2006.01)
*G01L 19/06* (2006.01)
*B64F 1/00* (2006.01)

(52) U.S. Cl.
CPC ............... *B64D 45/00* (2013.01); *B64F 1/005* (2013.01); *G01L 19/06* (2013.01)

(58) Field of Classification Search
CPC ....................................................... G01D 11/24
USPC ............................................................ 73/431
See application file for complete search history.

(56) References Cited

U.S. PATENT DOCUMENTS

| | | | | | |
|---|---|---|---|---|---|
| 4,981,038 | A | * | 1/1991 | Torres et al. | 73/182 |
| 6,901,793 | B1 | * | 6/2005 | Jefferson | 73/182 |
| 7,175,344 | B2 | * | 2/2007 | D'Ouince et al. | 374/208 |
| 8,517,301 | B1 | * | 8/2013 | Jefferson et al. | 244/1 R |
| 2008/0250884 | A1 | * | 10/2008 | Braun et al. | 73/866.5 |
| 2015/0059939 | A1 | * | 3/2015 | Dis et al. | 150/166 |

* cited by examiner

*Primary Examiner* — Lisa Caputo
*Assistant Examiner* — Jamel Williams
(74) *Attorney, Agent, or Firm* — Novak Druce Connolly Bove + Quigg LLP

(57) ABSTRACT

A protective cover for a pilot probe of an aircraft comprising a first tubular member formed of a rigid material, and a second tubular member formed of a rigid material, and a second tubular member formed of a flexible material including a first ply disposed on an inner side of the first tubular member, having an opening at a first end thereof for receiving the leading end of a pilot probe therein and a closed second end, and a second ply disposed on an outer side of the first tubular member, having a first end thereof secured about the first end of the inner ply and a second end secured to the second end of the first ply.

30 Claims, 3 Drawing Sheets

PROTECTIVE COVER FOR AIRCRAFT PITOT PROBES

This invention relates to probes mounted on the exteriors of aircraft and more particularly to protective covers for such probes.

BACKGROUND OF THE INVENTION

Typically, commercial and military aircraft are provided with probes mounted on the fuselages thereof for sensing wind pressure when in flight, used to compute the velocity and altitude of such aircraft in flight. Such probes are highly sensitive and proned to impairment upon being subjected to physical impact, extreme temperatures, certain reactive chemicals, various containments and the like, when the aircraft is out of service on the ground, simply parked, stored or undergoing repair and/or maintenance. In the prior art, there has been developed a number of protective covers for such probes, particularly pilot probes, which are designed to shield such probes from exposure to such harmful elements. Although such prior art covers have been useful in shielding such probes, more effective shielding and protection from such elements has been found to be desireable. In particular, it has been found to be desireable to more effectively shield such probes from physical impact which would impair their performance. Accordingly, it is the principal object of the present invention to provide a still more improved cover for a pilot probe which more effectively shields and protects such a probe from the aforementioned deleterious elements when an aircraft on which such probe or probes are mounted is on the ground, usually parked, stored or undergoing some form of repair or maintenance activity and subject to possible damage.

SUMMARY OF THE INVENTION

The principal object of the present invention is achieved by providing a protective cover for a pilot probe of an aircraft generally comprising a first tubular member formed of a rigid material, and a second tubular member fanned of a flexible material including a first ply disposed on an inner side of such first tubular member, having an open and for receiving the leading end of a pilot probe therein and a closed end, and a second ply disposed on an outer side of such first tubular member, having a first end thereof secured about the open end of the inner ply and a second end thereof secured to the second closed end of the first ply. Preferably, the second tubular member of such cover is formed of a flexible material, including a first segment extending through the first tubular member, forming an inner ply providing an opening therethrough having free and integral ends, and a second segment inverted relative to such first segment, extending along an outer side of the first tubular member and such first segment, forming an outer ply provided with integral and free ends, wherein the integral ends of the segments of the second tubular member are secured together to provide a closure at one end of such opening and the free ends of the segments are secured together to provide an entry opening for receiving the leading end of a probe into such closed opening. Furthermore, in a preferred embodiment of the invention, the first tubular member is provided with a longitudinally projecting appendage which is interleaved in and secured to the integral ends of the inner and outer plies, an O-ring formed of an elastomeric material is enclosed within the free ends of the plies forming a restricted entry opening providing an interferences fit with an inserted probe tube, the first tubular member is formed of silicone and the second tubular member is formed of a high temperature resistant, flame retardant material.

DETAILED DESCRIPTION OF THE PREFERRED EMBODIMENTS OF THE INVENTION

Figure 1:
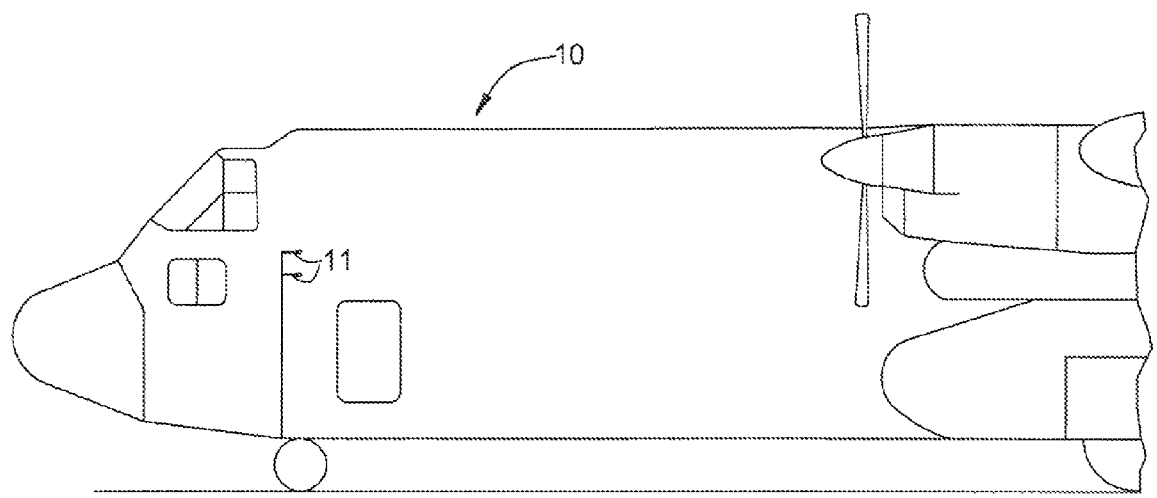
FIG. 1 is a partial, side elevational view of an aircraft having mounted on the fuselage thereof, several pilot probes on which protective covers incorporating the present invention are mountable.
Figure 2:
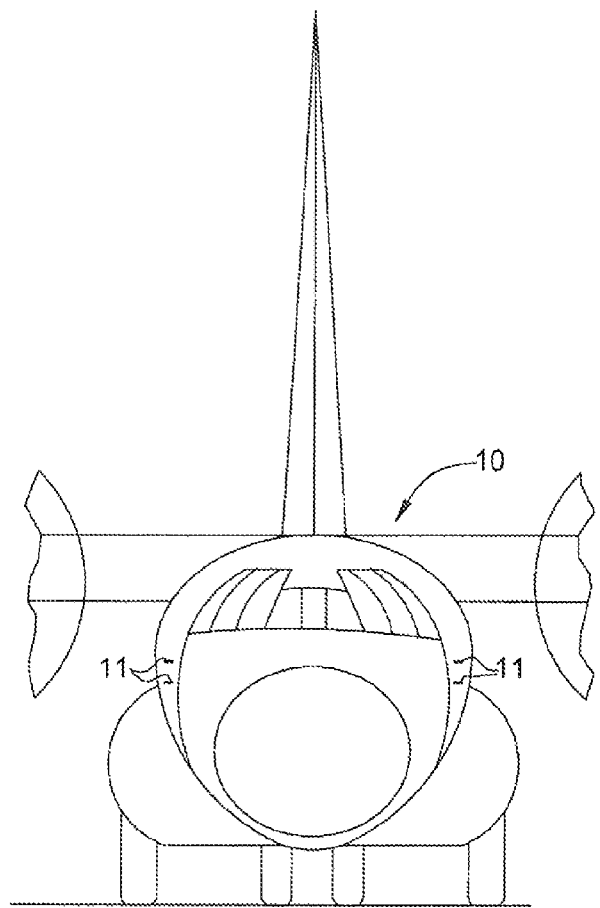
FIG. 2 is a partial, front elevational view of the aircraft shown in FIG. 1, having portions thereof broken away further illustrating the positions of several probes on the front end sides of the aircraft.
Figure 3:
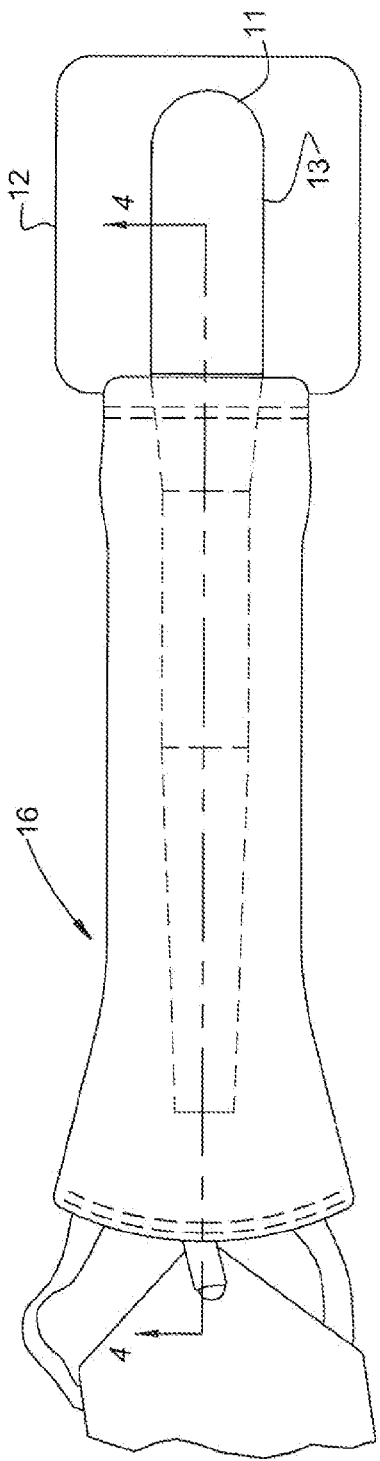
FIG. 3 is an enlarged, side plan view of a pilot probe shown in FIGS. 1 and 2, provided with a protective cover incorporating the present invention, having a portion thereof broken away.
Figure 4:
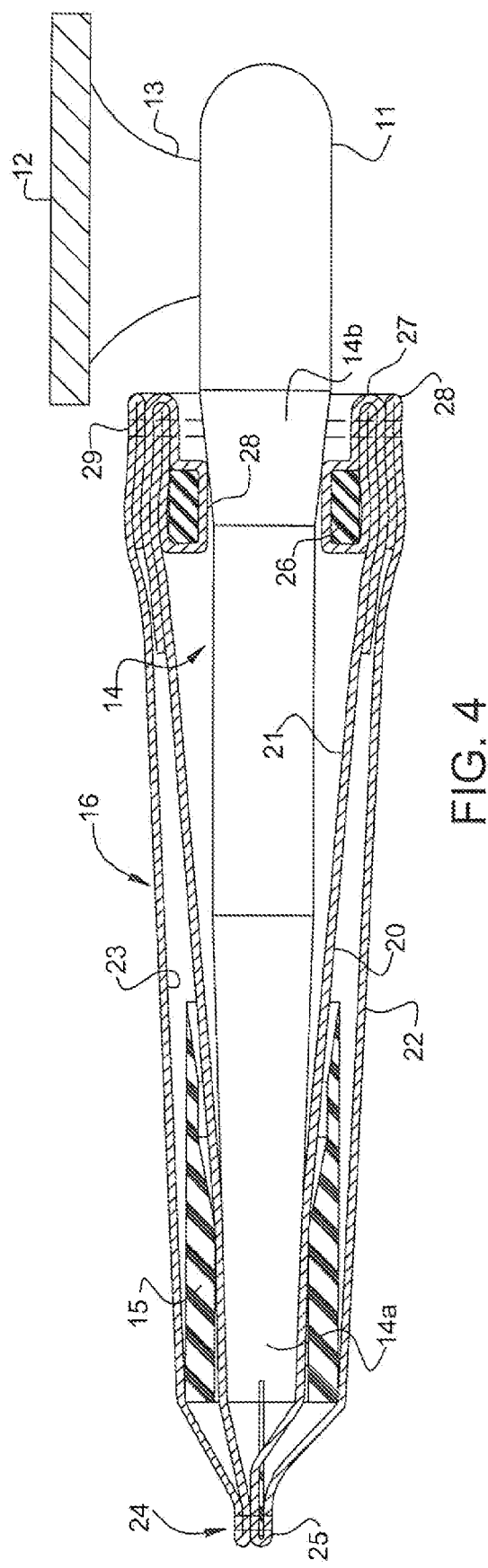
FIG. 4 is a top view of the probe and cover shown in FIG. 3, illustrating the cover in section, taken along line 4-4 in FIG. 3.

Referring to FIGS. 1 and 2, there is shown an aircraft 10 parked on the ground on which there is provided sets of pilot probes 11 mounted on opposite sides of the front end of the fuselage of the aircraft. As best shown in FIGS. 3 and 4, each of such probes includes a base portion 12 mounted on and secured to the fuselage of the aircraft, a support stand portion 13 formed integrally with base portion 12 and a the portion 14 having an end thereof formed integrally with an end of stand portion 13. When mounted on the fuselage, tube portion 14 is disposed parallel with the centerline of the aircraft with a port at the forward end thereof, and a longitudinal passageway provided with pressure sensors. As best shown in FIG. 4, the tube portion of the probe may be provided with frusto-conically configured exterior surfaces 14a and 14b. The sensors mounted in portion 14 are operatively connected to instrumentation in the aircraft which is functional to process data received from the sensors and display velocity and altitude information on an instrument panel located in the cockpit of the aircraft.

To protect the probe as described from impact, contaminants and harsh temperatures when the aircraft is parked on the ground, a protective cover 15 as shown in FIGS. 3 and 4 is intended to be fit onto the tubular end portion 14 of a probe which generally includes a rigid tubular member 15 and a flexible tubular member 16 consisting of two segments reconfigured to form an inner ply defining a longitudinal opening with closed and open ends, and an outer ply cooperating with such inner ply to provide an annular space, closed at both ends, in which the rigid tubular member 15 is inserted.

Figure 5:
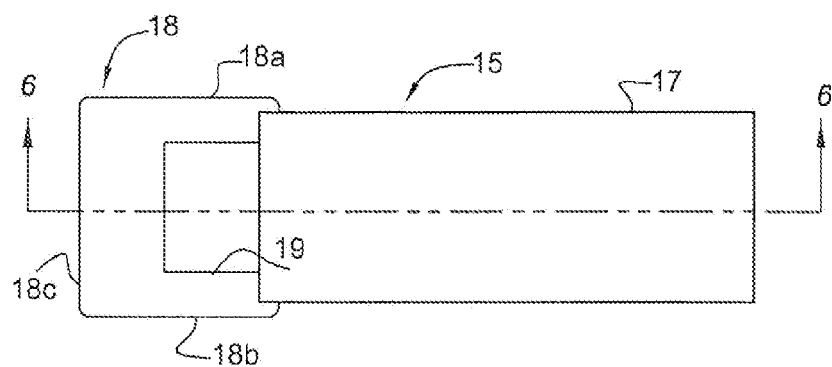
FIG. 5 is an enlarged top view of an insert provided in the cover shown in FIGS. 3 and 4.
Figure 6:
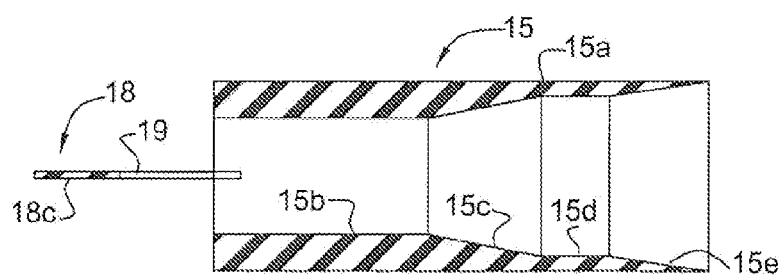
FIG. 6 is a cross sectional view of the insert shown in FIG. 5 taken along line 6-6 in FIG. 5.

Referring to FIGS. 5 and 6, rigid tubular member 15 includes a cylindrically configured body section 17 provided with a longitudinally projecting appendage 18 at one end thereof. Body section 17 has a cylindrical outer surface 15a, a cylindrical inner end surface 15b, frusto-conical inner, intermediate surface 15c, a cylindrical inner, intermediate surface 15d and an frusto-conical inner, end surface 15e. Appendage 18 has a u-shaped configuration, lying in a plane including the centerline of body section 17, provided with spaced leg portions 18a and 18b connected at a first set of ends to an end of body section 17 and connected at a second set of ends to a cross-piece portion 18c providing an opening 19 therethrough, also open to the interior of cylindrical body section 15.

Referring to FIGS. 3 and 4, a first segment of flexible tubular member 16 provides an inner, tubular ply 20 defining a longitudinal opening 21 adapted to receive tubular end portion 14 of a pilot probe 11, and an inverted, second integral segment thereof provides an outer tubular ply 22 overlying inner ply 20, cooperating with inner ply 21 to provide an annular space 23 in which rigid tubular member 13 is inserted, With rigid tubular member being disposed at an end of annular space 23 and appendage 18 projecting outwardly, an end of inner ply 20 extends through an end of the opening in member 15 and opening 19 of appendage 18, and is inverted as at 24 to provide a portion defining outer ply 22 with cross-piece portion 18c of the appendage being interposed between the two portions of the inner and outer plies. Such first set of ends of the inner and outer plies, with crosspiece portion 18c of appendage 18 interleaved between inverted portions of the plies are secured together by stitching to provide a closed end of opening 21.

The opposite end of inner ply 20 is wrapped around an annular, elastomeric member 26 and then inverted as at 27 to provide an interference fit opening 28 adapted to receive and engage the base end of tube portion 14 when the cover is mounted on a probe 11. The opposite end of the outer ply 22 similarly is inverted inwardly as at 28 with the inverted portions 27 and 28 being stitched together as at 29 so as to position annular member 28 within the inverted ends of the plies to provide an interference fit, inlet opening 28.

Figure 7:
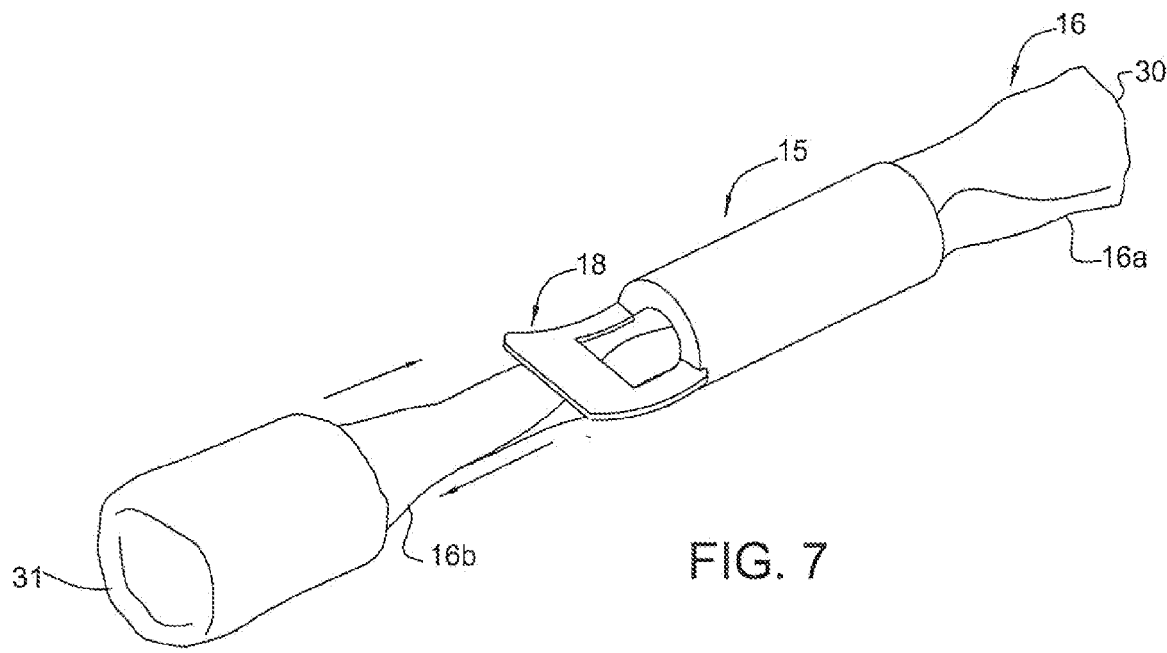
FIG. 7 is a perspective view of a flexible tubular component having been passed through an insert as shown in FIGS. 5 and 6, postured to be further manipulated and secured together to form the embodiment of the invention shown in FIGS. 3 and 4.

Referring to FIG. 7, the cover member as described may be formed by inserting flexible tubular member 16 through the opening in the rigid tubular member 15 with a first segment 16a thereof extending through the rigid tubular member, forming the inner ply 20 with one end thereof projecting through appendage opening 19 and an opposite end thereof remaining outside the other end of such segment; wrapping annular member 26 on the free end 30 of segment 16a consisting of an end of inner ply 20 and inverting to provide restrictive opening 28; inverting the free end of segment 16a consisting an end of inner ply 20 and inverting such end to provide restrictive opening 28; inverting the free end of segment 16b as at 31 to form the outer ply 22, confining member 15 between the inner and outer plies 20 and 22, at an end of formed annular compartment 23, with portion 18c of the appendage interleaved in the inverted portions of the inner ply; inverting the tree end of the outer ply as at 28 and positioning it about the inverted end of the inner ply; and stitching the ends of the plies as at 25 and 29 to complete the member.

The principal function of rigid tubular member 15 is to protect an inserted end portion of a probe from physical impacts either by resisting or absorbing such impacts. Preferably, such member is formed of an elastomeric material free of corrosive or contaminating substances, and may be formed of silicon, perhaps a silicon rubber. Preferably, the flexible tubular member is formed of a braided, woven material which is flame retardant, chemical resilient, highly abrasion resistant, water repellant and impervious to heat and condensation entrapment. It has been found that a para-aramid synthetic fiber material such as Kelvar stitched with fiberglass threads is most suitable as a flexible member material.

In addition to all of the other attributes of prior art covers, the present invention provides improved ease in mounting a cover on a probe, prevents the tip of the probe from contacting the closed end of the probe upon applying the cover on the probe and further provides increased protection of the probe in service from physical impact. In addition, the improved cover complies with more stringent requirements in the performance of such covers.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A protective cover for a pilot probe of an aircraft comprising:
   a first tubular member formed of a rigid material; and
   a second tubular member formed of a flexible material including a first ply disposed on an inner side of said first tubular member, having an opening at a first end thereof for receiving the leading end of a pilot probe therein and a closed second end thereof, and a second ply disposed on an outer side of said first tubular member, having a first end thereof secured about said first end of said inner ply and a second end thereof secured to said second end of said first ply.

2. The cover of claim 1 including a member secured to at least one of said second ends of said plies which may be gripped and pulled to remove said cover mounted on a pilot probe.

3. The cover of claim 1 including a banner secured to at least one of said second ends of said plies bearing instructions for removal of said cover prior to take-off.

4. The cover of claim 1 wherein said first tubular member has a length shorter than the length of the space between said plies.

5. The cover of claim 1 wherein said first tubular member includes an appendage projecting from an end thereof secured to at least one of said second ends of said plies.

6. The cover of claim 5 wherein said appendage includes an opening therethrough accommodating a portion of said second end of said first ply.

7. The cover of claim 1 wherein said first tubular member includes at least one frusto-conically configured inner surface accommodating receipt of the leading end of a pilot probe upon applying said cover thereon.

8. The cover of claim 1 wherein said first tubular member is formed of a high temperature. flame retardant material.

9. The cover of claim 1 wherein said first tubular member is formed of silicone.

10. The cover of claim 1 wherein a portion of at least one first end portion of a ply of said second tubular member is configured to form an entry into said opening which receives a pilot probe, providing an interference fit with a probe received therein.

11. The cover of claim 10 wherein said configured portion of said ply is provided with an O-ring formed of an elastomeric material.

12. The cover of claim 1 wherein said second tubular member is formed of a woven material.

13. The cover of claim 12 wherein said woven material is braided.

14. The cover of claim 1 wherein said second tubular member is formed of braided glass fiber threads.

15. The cover of claim 1 wherein said second tubular member is formed of braided para-aramid fibers.

16. A protective cover for a pilot probe of an aircraft comprising:
   a first tubular member formed of a rigid material; and
   a second tubular member funned of a flexible material including a first segment extending through said first tubular member forming an inner ply providing an opening therethrough having free and integral ends, and a second segment inverted relative to said first segment, extending along an outer side of said first tubular member and said first segment thereof, forming an outer ply provided with integral and free ends,
   wherein the integral ends of said segments of said second tubular member are secured together to provide a closure at one end of said opening and the free ends of said segments are secured together to provide an entry opening for receiving the leading end of a probe into said closed opening.

17. The cover of claim 16 wherein said first tubular member has a length shorter than length of said plies.

18. The cover of claim 17 wherein said first tubular member is disposed adjacent a closed end of said opening.

19. The cover of claim 18 wherein said first tubular includes a longitudinally projecting appendage interleaved with and secured to the integral ends of said segments of said second tubular member.

20. The cover of claim 19 wherein said appendage includes an opening therethrough through which at least the integral portion of said first segment extends.

21. The cover of claim 16 wherein the free ends of said segments are inverted with the inverted portions thereof being secured together.

22. The cover of claim 21 including an O-ring formed of an elastomeric material being encompassed by a portion of at least one of said free ends of said segments providing an opening therethrough for receiving and engaging a portion of a pilot probe with an interference fit.

23. The cover of claim 16 wherein an inner surface of said first tubular member is provided with at least one frusto-conically configured surface accommodating the receipt of a pilot probe in said opening.

24. The cover of claim 16 wherein said first tubular member is formed of a high temperature, flame retarded material.

25. The cover of claim 16 wherein said first tubular member is formed of silicone.

26. The cover of claim 16 wherein said second tubular member is formed of a woven material.

27. The cover of claim 26 wherein said woven material is braided.

28. The cover of claim 16 wherein said second tubular material is formed of braided glass fiber threads.

29. The cover of claim 16 wherein said second tubular member is formed of braided para-aramid fiber.

30. The cover of claim 16 including a looped member secured to the integral ends of said sections which may be gripped for removal of said cover from a pilot probe.

* * * * *